Feb. 17, 1970  F. E. ANGLADA ET AL  3,496,265
PROCESS FOR THE MANUFACTURE OF EXTENSIBLE MOULDED ARTICLES
HAVING PERFORATED OR RETICULATED STRUCTURE
Filed March 15, 1966

INVENTORS
FEDERICO ESTEVE ANGLADA
JUAN DUARRY SERRA

United States Patent Office 3,496,265
Patented Feb. 17, 1970

3,496,265
PROCESS FOR THE MANUFACTURE OF EXTENSIBLE MOULDED ARTICLES HAVING PERFORATED OR RETICULATED STRUCTURE
Federico Esteve Anglada, Ronda Universidad 35, and Juan Duarry Serra, Calle Rosellon 1, both of Barcelona, Spain
Filed Mar. 15, 1966, Ser. No. 534,479
Claims priority, application Spain, Mar. 18, 1965, 311,071
Int. Cl. B29c 13/00; B29h 3/04
U.S. Cl. 264—306
1 Claim

ABSTRACT OF THE DISCLOSURE

Moulded reticulated articles of elastomeric material are made by using a mould made of absorbent material having prominences arranged to produce the recticulations in the finished article. The surfaces of the tops of the prominences are treated to make them non-absorbent to the material.

---

The present invention relates to a process for the manufacture of extensible moulded articles having perforated or reticulated structure, of natural or synthetic rubber or of a synthetic plastic material.

There are known different processes for the manufacture of perforated or recticulated structures of rubber, latex or a synthetic plastic material or the like, e.g. for elastic bandages, corsets, shoes, orthopedic and other articles, according to which the rubber mixture or the mixture of a synthetic plastic material is deposited on the corresponding moulds by pulverization, electrolitic baths or pressure rolls. However, the manufacture of such reticulated structures by means of the known dipping process, which is broadly used for the manufacture of moulded articles with thin walls and continuous surfaces, has been considered as impossible hitherto. As the known processes for the manufacture of such perforated or reticulated structures present many disadvantages due to their difficult industrial realization or small efficiency, the inventors, having effected investigations with the aim to overcome the difficulties which hitherto have not allowed the manufacture of said structures by means of the dipping process, have found an improved dipping process, which is the object of the present invention and which allows the manufacture of said perforated or reticulated structures under more favourable conditions as by any of the processes known hitherto.

It is therefore the object of the present invention to provide a dipping process allowing the manufacture of moulded articles with perforated or reticulated structure.

This process is essentially characterized by the utilization of a dipping mould of a porous or absorbent material having a shape similar to that of the article to be produced and provided on its moulding surface with multiple small pyramid or cone like prominences, determined by multiple crossed grooves or slots and having a height corresponding to the thickness of the wall of the article to be obtained, these prominences being adapted to produce with their tops corresponding holes in the wall of this article, the said process comprising the steps of covering the tops of the small pyramid or cone like prominences with which the moulding surface of the dipping mould is provided, by a layer of a sealing material, such as a varnish insoluble in the dipping bath, for preventing the adherence and/or absorption on these tops of the dispersing agent of said dipping bath, so that these tops remain free of any coating of solid particles suspended in the dipping bath and determine corresponding holes in the wall of the moulded article; dipping the so prepared mould into a mixture of latex of natural or synthetic rubber containing the necessary ingredients for its later vulcanization or being already prevulcanized, or into the suspension bath of the synthetic plastic material; leaving the mould in this bath for the time necessary to obtain the desired thickness of the deposited material; removing the mould from the bath; revolving the mould and exposing it to heat in a tunnel stove or oven for drying and/or vulcanization of the deposited coating; and, finally, separating the obtained article from the mould.

For the better understanding of the invention one embodiment thereof is described with reference to the accompanying drawings, in which.

Figure 1:
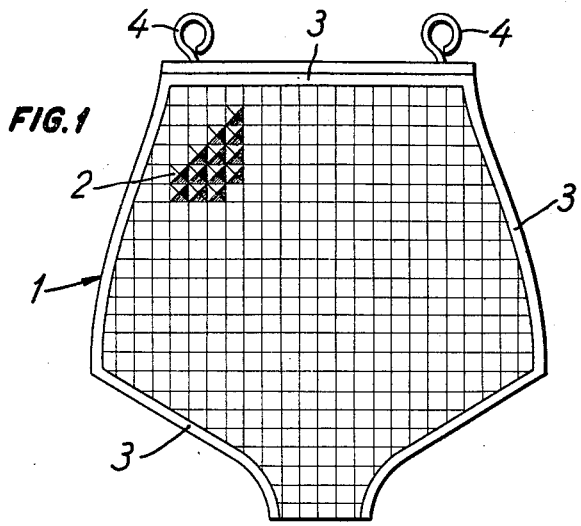
FIG. 1 represents a diagrammatic front elevational view of an appropriate mould for the manufacture of a corset according to the process of the present invention.

With reference to FIG. 1 there is represented diagrammatically a mould 1. This mould, suitable for the manufacture of corsets, may be constituted of a porous or absorbent material as e.g. plaster, porous porcelain, ebonite or a porous synthetic plastic material and is provided on its moulding surface with multiple small pyramid like prominences 2, determined by multiple crossed grooves or slots having a height corresponding to the thickness of the wall of the article to be obtained and adapted to produce with their tops corresponding holes in this article. In this example, the mould as represented, has a plane surface on its lateral borders 3, adapted to produce in the moulded corset at the sides and at the border of the openings for the passage of the legs corresponding unperforated strengthenings. The mould 1 is provided with two fastening rings 4 arranged on its upper part and by which the mould is suspended during the dipping process in a manner known per se.

Figure 3:
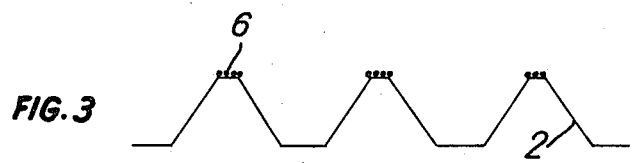
FIGS. 3 and 4 illustrate with respect to the sectional view of the portion of the mould represented in FIG. 2 successive phases of the process according to the invention.
Figure 4:
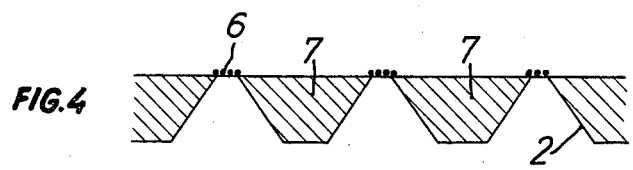

For performing the process according to the invention, the tops 5 of the multiple small pyramid or cone like prominences 2 with which the moulding surface of the dipping mould 1 is provided, are covered by a layer of a sealing material, such as a varnish, insoluble in the dipping bath, as shown diagrammatically at 6 (FIG. 3). These coatings prevent the adherence and/or absorption of the dispersion agent of said bath on the tops 5, so that in these tops no deposition of any solid particles suspended in the dipping bath may be possible and said tops determine corresponding holes in the wall of the moulded article. The mould so prepared is then dipped, in a manner known per se, into the mixture of latex of natural or synthetic rubber containing the necessary ingredients for its later vulcanization, or into such a mixture already prevulcanized, or into the suspension bath of the synthetic plastic material, and left therein for the time necessary to obtain the desired thickness of the deposited material, as shown at 7 in FIG. 4. Finally and as herein before described, the deposited material forming the coating 7 is dried and/or vulcanized, and the obtained article is separated from the mould.

Figure 2:
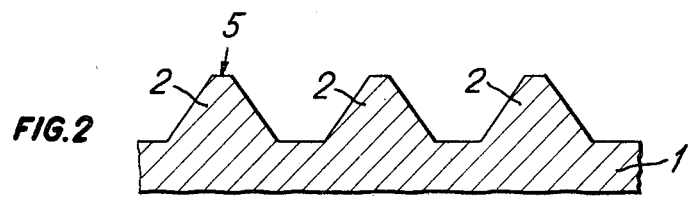
FIG. 2 shows a sectional view on an enlarged scale of a portion of said mould.
Figure 5:
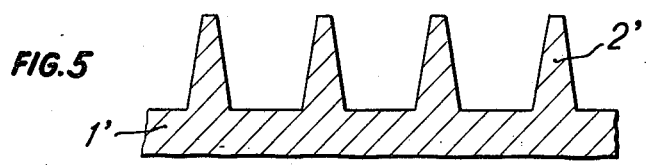
FIG. 5 is a sectional view, similar to that of FIG. 2, showing a modification of the shape of the mould surface.

The modification represented in FIG. 5, in which the body of the mould is designated with 1' and the multiple small pyramid or cone like prominences provided on the moulding surface are designated with 2', shows that said prominences may have a more or less inclined lateral surface. In the case of FIG. 2, the prominences 2 determine in the perforated or reticulated structure corresponding holes which are very open on one of the faces of the structure, whereas the prominences 2' (FIG. 5) determine far more closed holes. According to the effects which are to be obtained, said prominences may have any other shape.

It may be understood, that though in FIG. 1 there is shown a mould for the manufacture of corsets, the very same process may be applied for the manufacture of any other moulded article having thin walls and being provided with multiple perforations.

What we claim is:

1. Process for the manufacture of extensible moulded articles having a reticulated structure of elastomeric material using a dipping mould of an absorbent material having a shape similar to that of the article to be produced and provided on its moulding surface with multiple small outwardly projecting prominences determined by multiple crossed grooves having a height corresponding to the thickness of the wall of the article to be obtained, comprising the steps of covering the tops of said prominences with a sealing material for preventing the adherence thereon of the dispersing agent of a dipping bath whereby said tops will remain free of solid particles suspended in a dipping bath for defining corresponding holes in the wall of an article moulded thereon, dipping the thus prepared mould into a bath of elastomeric material containing the ingredients for its later solidification, leaving the mould in said bath for the time necessary to obtain the desired thickness of the deposited material, removing the mould from the bath, revolving the mould and exposing it to heat for solidifying of the deposited material, and separating the article from the mould.

References Cited

UNITED STATES PATENTS

| | | | |
|---|---|---|---|
| 1,923,524 | 8/1933 | Young | 18—41 |
| 2,525,272 | 10/1950 | Rhoton | 264—307 X |
| 3,005,237 | 10/1961 | Anderson | 264—306 X |
| 1,475,738 | 11/1923 | Boecler | 264—306 |
| 2,294,966 | 9/1942 | Dreyfus. | |
| 2,295,735 | 9/1942 | Hurt | 264—306 X |
| 2,559,969 | 7/1951 | Kennedy | 117—5.5 X |
| 2,804,653 | 9/1957 | Talalay | 264—338 X |
| 2,934,790 | 5/1960 | Schwayder. | |
| 2,977,636 | 4/1961 | McGuire | 264—303 X |
| 3,303,254 | 2/1967 | Simons | 264—318 X |
| 3,384,502 | 5/1968 | Japs | 117—5.5 |
| 2,132,501 | 10/1938 | Watkins | 264—338 X |

ROBERT F. WHITE, Primary Examiner

N. RUSHEFSKY, Assistant Examiner

U.S. Cl. X.R.

249—115; 264—303, 338